(12) United States Patent
Graf

(10) Patent No.: US 10,407,652 B1
(45) Date of Patent: Sep. 10, 2019

(54) BARREL APPARATUS

(71) Applicant: Raymond L. Graf, Memphis, IN (US)

(72) Inventor: Raymond L. Graf, Memphis, IN (US)

( * ) Notice: Subject to any disclaimer, the term of this patent is extended or adjusted under 35 U.S.C. 154(b) by 341 days.

(21) Appl. No.: 15/210,026

(22) Filed: Jul. 14, 2016

(51) Int. Cl.
| | |
|---|---|
| *C12H 1/22* | (2006.01) |
| *B65D 3/00* | (2006.01) |
| *B65D 43/00* | (2006.01) |
| *B65D 8/00* | (2006.01) |
| *B65D 39/00* | (2006.01) |

(52) U.S. Cl.
CPC .............. *C12H 1/22* (2013.01); *B65D 9/04* (2013.01); *B65D 39/0005* (2013.01)

(58) Field of Classification Search
CPC ... C12H 1/22; C12H 1/16; C12H 1/14; C12G 3/065; C12G 3/06; C12L 9/00; B65D 9/02; B65D 9/04; B65D 81/245; B65D 7/045; B65D 711/06; B65D 781/3802; B65D 39/0005; B65D 11/16; A41D 13/0125; A41D 13/0512; B67D 1/0801
USPC ........... 99/275, 276, 277, 277.1, 277.2, 278; 217/75, 88, 72; 220/4.11, 4.1, 4.08, 4.04, 220/592.19
See application file for complete search history.

(56) References Cited

U.S. PATENT DOCUMENTS

| | | | |
|---|---|---|---|
| 49,202 A | 8/1865 | Williamson | |
| 159,064 A | 1/1875 | Banker | |
| 194,529 A | 8/1877 | Munroe | |
| 211,146 A | 1/1879 | Gardner et al. | |
| 1,014,883 A | 1/1912 | Klein | |
| 2,017,235 A | 10/1935 | Drew | |
| 2,045,859 A | 6/1936 | Klein | |
| 2,079,378 A | 5/1937 | Mills | |
| 2,086,073 A | 7/1937 | Francescon | |
| 2,089,805 A * | 8/1937 | Lear .................... | B65D 7/22 220/4.06 |
| 2,135,622 A * | 11/1938 | Nagle ................... | C12G 3/07 99/277.1 |
| 2,289,245 A * | 7/1942 | Dant .................... | C12G 3/07 99/277.1 |
| 3,021,780 A | 2/1962 | Bobbe | |
| 3,220,555 A | 11/1965 | Silha | |
| RE26,408 E * | 6/1968 | Labs .................... | C12H 1/22 99/277.1 |
| 3,842,723 A * | 10/1974 | Boucher ............... | B65D 9/04 99/277.1 |
| 4,558,639 A | 12/1985 | Hojnoski | |
| 5,054,381 A | 10/1991 | DePeaux et al. | |
| 5,174,461 A * | 12/1992 | Sullivan ............... | B65D 7/045 217/3 CB |
| 7,762,179 B2 | 7/2010 | Eustis | |

(Continued)

FOREIGN PATENT DOCUMENTS

| | | |
|---|---|---|
| EP | 1609724 | 12/2005 |
| FR | 2864965 | 7/2005 |

*Primary Examiner* — Michael G Hoang
*Assistant Examiner* — Tiffany T Tran
(74) *Attorney, Agent, or Firm* — Middleton Reutlinger

(57) ABSTRACT

A wooden barrel apparatus for aging products includes an inner wooden barrel positioned in an outer wooden barrel. A first volume may be defined within the inner wooden barrel. A second volume may be defined between the inner wooden barrel and the outer wooden barrel. One or more surfaces of the inner wooden barrel and the outer wooden barrel may be charred.

16 Claims, 6 Drawing Sheets

(56) References Cited

U.S. PATENT DOCUMENTS

| | | | | |
|---|---|---|---|---|
| 8,181,408 B1* | 5/2012 | Triglia | ............... | B44C 5/043 52/223.6 |
| 9,032,864 B2 | 5/2015 | Roleder | | |
| 2013/0276292 A1* | 10/2013 | Kousens | ............ | F16B 41/002 29/525.02 |
| 2014/0202337 A1 | 7/2014 | Roleder | | |

* cited by examiner

BARREL APPARATUS

BACKGROUND

The present embodiments relate to a barrel apparatus, and particularly, but not limited to, a wooden barrel apparatus for whiskey.

SUMMARY

In some embodiments, a wooden barrel apparatus for aging whiskey may include an inner wooden barrel having a first volume adapted for a first liquid defined by a first end cap, an opposing second end cap, and a plurality of staves. The first end cap is interconnected to the second end cap by the plurality of staves circumferentially positioned in abutting relationship to each other. One or more interior surfaces of the inner wooden barrel is charred. An outer wooden barrel surrounds the inner wooden barrel. The outer wooden barrel has a first end cap, an opposing second end cap, and a plurality of staves interconnecting the first end cap and the opposing second end cap. A second volume is adapted for a second liquid between the outer wooden barrel and the inner wooden barrel. One or more interior surfaces of the outer wooden barrel is charred. The outer wooden barrel has a bung hole within one or more of the plurality of staves. The inner wooden barrel has a bung hole within one or more of the plurality of staves. The first volume can be separately aged from the second volume.

Further in some embodiments, the inner wooden barrel includes a first stopper and the outer wooden barrel includes a second stopper separate from the first stopper. A dowel pin may be inserted within each one of the bung hole of the inner wooden barrel and the outer wooden barrel. The bung hole of the inner wooden barrel is smaller than the bung hole of the outer wooden barrel. One or more exterior surfaces of the inner wooden barrel is charred. An outside diameter of the inner wooden barrel is smaller in diameter than a top opening of the outer wooden barrel, wherein the top opening receives the first end cap or the opposing second end cap of the outer wooden barrel. The first volume is about one-half of the second volume. The plurality of staves of the inner wooden barrel are substantially planar and substantially perpendicular to at least one of the first end cap and the second end cap of the inner wooden barrel. The inner wooden barrel is positionable in a first rotational position relative to the outer wooden barrel wherein the bung hole of the inner wooden barrel is substantially aligned with the bung hole of the outer wooden barrel and a second rotational position relative to the outer wooden barrel, wherein the second rotational position is different from the first rotational position. After aging, the first liquid has different properties from the second liquid in at least one of appearance, smell, and taste.

In some embodiments, a method of aging whiskey in a wooden barrel apparatus includes the steps of providing an outer wooden barrel and providing an inner wooden barrel inside the outer wooden barrel. An interior surface of the outer wooden barrel may be charred. At least one of the interior surface and the exterior surface of the inner wooden barrel may be charred. An inner volume of the inner wooden barrel may be filled with contents. The inner wooden barrel and the contents of the inner volume thereof may be sealed. An outer volume between the outer wooden barrel and the inner wooden barrel may be filled with contents. The outer wooden barrel and the contents of the outer volume thereof may be sealed. The contents of each of the inner volume and outer volume may be aged.

Further in some embodiments, the steps of sealing the outer wooden barrel and sealing the inner wooden barrel are separate steps. The rotational orientation of the inner wooden barrel relative to said outer wooden barrel may be locked. The step of locking the rotational orientation of the inner wooden barrel relative to the outer wooden barrel includes a single bung extending between each bung hole of the inner wooden barrel and the outer wooden barrel. The method further includes the step of removing the single bung before the steps of filling each of the inner volume and the outer volume. The inner volume may be sealed with a bung that is separate from the bung used to seal the outer volume. The contents of the outer volume may be removed before the contents of the inner volume. The wooden barrel apparatus may be refilled after removing the contents of the inner volume and the outer volume. The interior surface of the inner wooden barrel may be charred. The contents may have different properties after the step of aging the contents of each of the inner volume and the outer volume. The contents may have different properties may include a difference in at least one of appearance, proof, taste, and smell. The step of filling the inner volume and the outer volume includes using the same contents for each of the inner volume and the outer volume.

These and other advantages and features, which characterize the embodiments, are set forth in the claims annexed hereto and form a further part hereof. However, for a better understanding of the embodiments, and of the advantages and objectives attained through its use, reference should be made to the Drawings, and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

As shown in the figures, a wooden barrel apparatus 20 for aging whiskey may include an inner wooden barrel 30 and an outer wooden barrel 40. The inner wooden barrel 30 may be positioned within the outer wooden barrel 40 to create a variety of characteristics when aging whiskey or other distilled beverage. However, undistilled beverages or other consumer products or contents such as, but not limited to, food are contemplated. The wooden barrel apparatus 20 may also be used initially for one type of beverage or product and then reused with a similar or different product. For example, a first use for whiskey and a second use for wine making is possible. The characteristics of the products or contents created may include, but are not limited to, a desired proof, appearance (e.g. color), smell, and taste.

Figure 3:
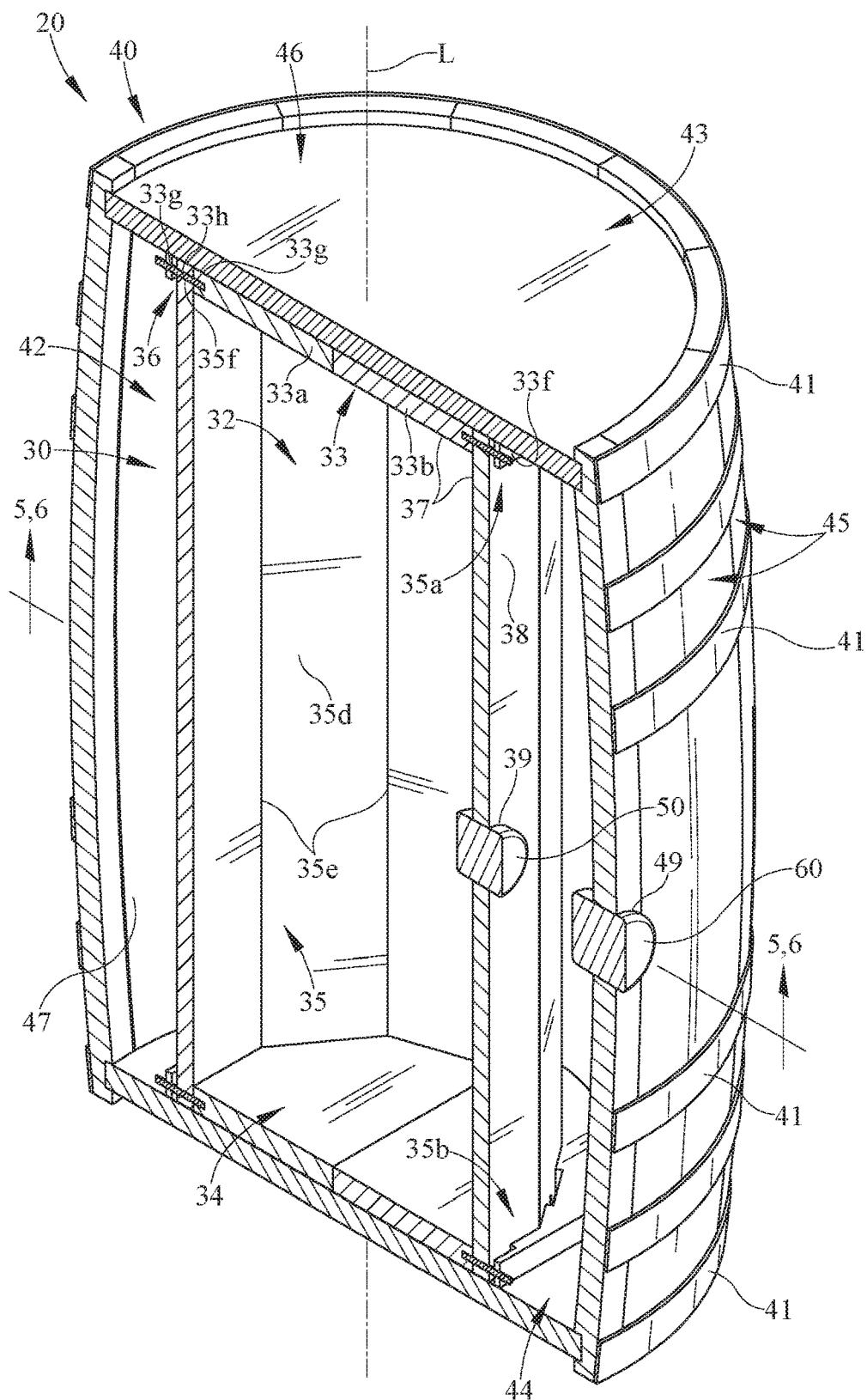
FIG. 3 is a perspective cross sectional view of the inner wooden barrel embodiment of FIG. 1 taken along line 3-3 positioned within an embodiment of an outer wooden barrel, illustrating an embodiment of sealing the barrels.

The inner wooden barrel 30 includes a first volume or inner volume 32 adapted for a first liquid or contents. The outer wooden barrel 40 surrounds the inner wooden barrel 30 thereby creating a second volume or outer volume 42 adapted for a second liquid or contents between the outer wooden barrel 40 and the inner wooden barrel 30. The first contents and second contents may have one or more different properties, before, during, and/or after aging within the barrels, such as but not limited to proof, appearance, smell, and taste. Alternatively, they may be similar in one or more characteristics. It should be understood to persons skilled in the art that the contents inserted into one or more of the barrels may be a variety of materials and properties, such as, liquid and/or solid. Solid material may include items such as a variety of wood chip species. One embodiment of the first volume 32 and the second volume 42 may be different after aging. Further, the first volume 32 may be about one half of the second volume 42. The inner wooden barrel 30 and outer wooden barrel 40 may be made of wood such as, but not limited to, white oak. It is understood that the material of inner wooden barrel 30 and outer wooden barrel 40 may be different, such as different wood species. The construction of the barrels 30 and 40 may be different. For example, the embodiment of the outer wooden barrel 40 is shown to have metal hoops 41 or include non-wood material, whereas the embodiment of the inner wooden barrel 30 does not include non-wood material. Further, each of the inner wooden barrel 30 and the outer wooden barrel 40 may be sealed by one or more stoppers or bungs 50, 60, respectively (FIG. 3). For example, a single bung 70 (FIG. 4) may seal one or both the barrels. One or more surfaces of the inner wooden barrel 30 and the outer wooden barrel 40 may be charred. In one embodiment the interior surfaces 37 of the inner wooden barrel 30 may be charred as well as the interior surfaces 47 of the outer wooden barrel 40. In another embodiment, the interior surfaces 37 and exterior surfaces 38 of the inner wooden barrel 30 may be charred as well as the interior surfaces 47 of the outer wooden barrel 40.

As illustrated in figures, the inner wooden barrel 30 may define the first volume 32 for first contents. In the embodiment shown, the first volume 32 may be bounded at the ends by a first end cap 33 and opposing second end cap 34. A plurality of staves 35 may interconnect the first end cap 33 and the second end cap 34. The plurality of staves 35 may be circumferentially positioned in an abutting relationship to each other, as shown. The first volume 32 defined by the inner wooden barrel 30 can be separately aged from the second volume 42 between the inner wooden barrel 30 and the outer wooden barrel 40. As such the contents of the first volume 32 of the inner wooden barrel 30 do not substantially mix with the second contents of the second volume 42 during aging. However, it is understood that contents of the first and/or second contents and/or properties of the wood may seep or pass into and/or out of the inner wooden barrel.

Figure 1:
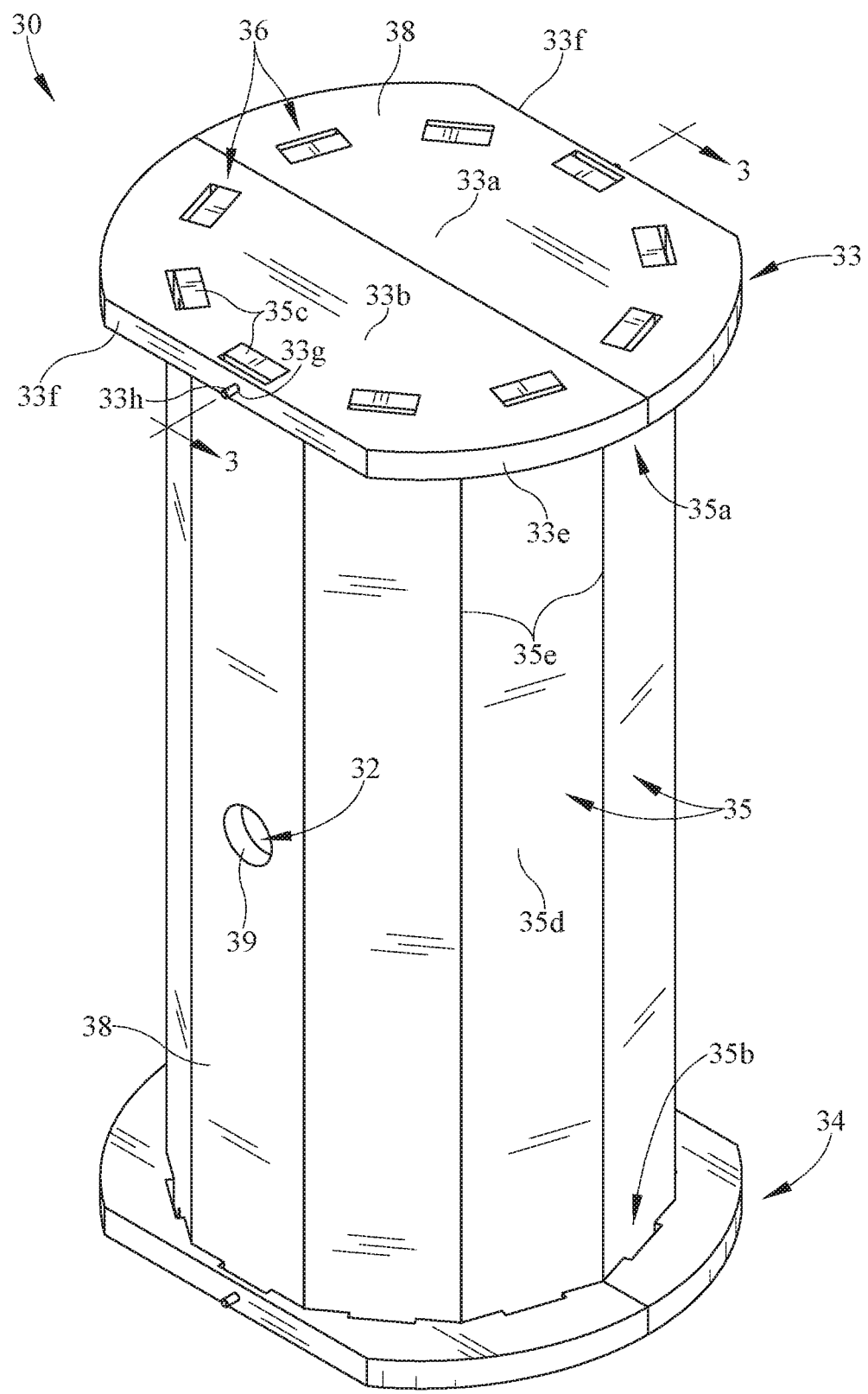
FIG. 1 is a perspective view of one embodiment of the inner wooden barrel.
Figure 2:
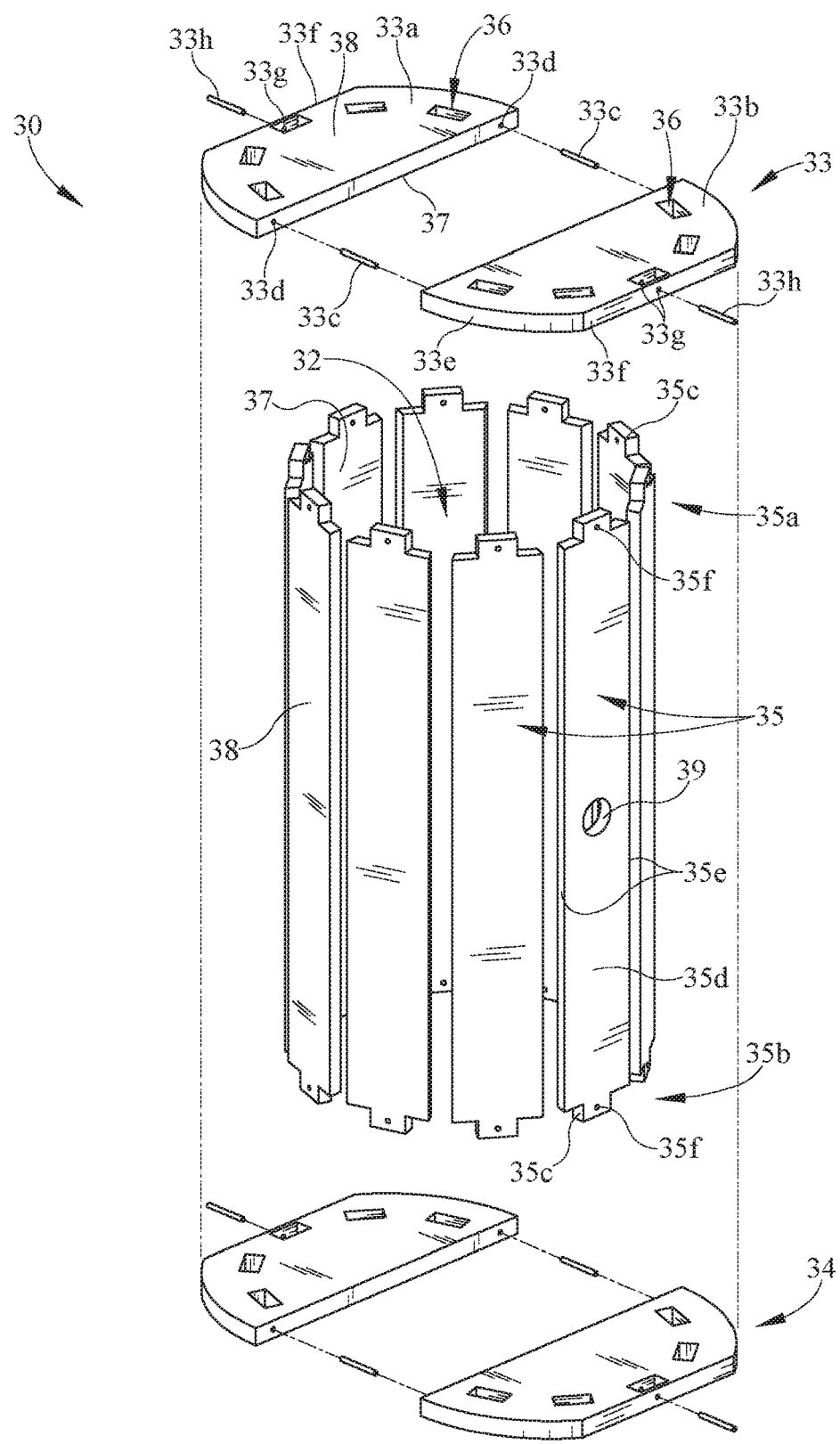
FIG. 2 is an exploded view of the inner wooden barrel embodiment of FIG. 1.

In the embodiment of the inner wooden barrel 30 shown in the figures, the opposing ends of the inner wooden barrel 30 may be substantially mirror images of each other, and will be described herein in regards to the first end cap 33 and first end 35a of the plurality of staves 35. The second end cap 34 and the engagement with the second end 35b of the plurality of staves 35 is generally the same, however it is understood that each end cap 33, 34 and/or plurality of staves 35 at opposing ends 35a, 35b of the inner wooden barrel 30 may be dissimilar. The first end cap 33 includes a first member 33a and a second member 33b connected by one or more dowel pins 33c and opposing receiving holes 33d. The outer periphery 33e of the first end cap 33 is substantially circular in shape and may include one or more truncated edges 33f. Two truncated edges 33f are shown on opposing sides of the first end cap 33, one truncated edge 33f on the first member 33a and another on the second member 33b. A plurality of openings 36 extend from an interior surface 37 to an exterior surface 38 of the first member 33a and second member 33b in a circumferential spaced pattern. The plurality of openings 36 receive the first ends 35a of the plurality of staves 35. In the embodiment shown, the first end 35a of each stave 35 includes a tab 35c extending from a main body 35d of the stave 35 (FIG. 2). The tab 35c is received by the opening 36 of the respective first member 33a or second member 33b, or more generally the first end cap 33. One or more of the tabs 35c may include a lateral opening 35f in axial alignment with one or more lateral openings 33g extending from the outer periphery 33e of the first end cap 33 and through the opening 36 of one or more first and second members 33a, 33b, respectively. The outer periphery 33e that includes the lateral openings 33g are in the truncated edges 33f of the first end cap 33. A dowel pin 33h is received by the tab opening 35f and the lateral openings 33g of each of the first member 33a and second member 33b interlocking the staves 35 and the first end cap 33 and thus maintaining spatial relationship between the first end cap 33, the second end cap 34, and the plurality of staves 35. The lateral edges 35e of each stave 35 are in an abutting relationship to each other when assembled. As shown in FIGS. 1 and 3-6, the lateral edges 35e of each stave 35 extending between the interior surface 37 to the exterior surface 38 may not be substantially parallel to each other. The interior surface 37 of the stave 35 may have a smaller width or smaller surface area than the exterior surface 38 of the stave 35. The staves 35 as shown may be substantially planar and/or substantially perpendicular to at least one of the first end cap 33 and second end cap 34 of the inner wooden barrel 30. It should be understood that staves 35 may be connected to each other by a variety of engagements such as, but not limited to, surface abutment, lapped, and tongue-and-groove. The inner wooden barrel 30 includes one or more bung holes 39 within one or more of the plurality of staves 35. The bung hole 39 may receive a bung or stopper 50 to substantially seal the first contents within the first volume 32. One or more surfaces of the interior surfaces 37 and/or exterior surfaces 38 of the inner wooden barrel 30 may be charred.

As shown in FIGS. 3-6, the outer wooden barrel 40 includes a first end cap 43 and an opposing second end cap 44 interconnected by a plurality of staves 45. The plurality of staves 45 and the first end cap 43 and second end cap 44 may be held together by one or more metal hoops 41. The interior surface 47 of the outer wooden barrel 40 may be charred. As shown in FIGS. 3-6, the diameter of the bung hole 39 of the inner wooden barrel 30 may be smaller in diameter than the diameter of the bung hole 49 of the outer wooden barrel 40. The bung hole 49 of the outer wooden barrel 40 may receive a bung or stopper 60 to substantially seal the second contents within the second volume 42. Although the bung 60 of the outer wooden barrel 40 is shown to be separate from the bung 50 of the inner wooden barrel 30, it is understood that they may be combined, at least in part.

The inner wooden barrel 30 is positioned within the outer wooden barrel 40. The inner wooden barrel 30 may be inserted through a top opening 46 of the outer wooden barrel 40 before placement of the first end cap 43 and/or second end cap 44 of the outer wooden barrel 40. As such the outside diameter of the inner wooden barrel 30 is smaller in diameter than the top opening 46 of the outer wooden barrel 40. The relative rotational position between the inner wooden barrel 30 and the outer wooden barrel 40 may be substantially fixed or may vary between a first rotational position (FIGS. 3-5) and a second rotational position (FIG. 6), wherein the second rotational position is different from first rotational position. The inner wooden barrel 30 may be in a first rotational position (FIG. 5) relative to the outer wooden barrel 40 such that the bung hole 39 of the inner wooden barrel 30 is substantially aligned with the bung hole 49 of the outer wooden barrel 40. In the second rotational position (FIG. 6), the bung hole 39 of the inner wooden barrel 30 may be substantially out of alignment with the bung hole 49 of the outer wooden barrel 40. The inner wooden barrel 30 may be longitudinal and radially held in place as shown in one embodiment as a result of the first end cap 33 and second end cap 34 of the inner wooden barrel 30 extending between or abutting the first end cap 43 and second end cap 44 of the outer wooden barrel 40. Further, relative rotation between barrels 30, 40 about the longitudinal axis L may be limited because of the contact of the inner wooden barrel end caps 33 and 34 to the outer wooden barrel end caps 43 and 44 and/or the outer periphery 33e of the inner wooden barrel end caps abutting the interior surfaces 47 of the outer wooden barrel 40.

It may be desirable, to lock the relative position between the barrels 30 and 40 to maintain alignment of the bung holes 39 and 49 of the respective barrels 30 and 40. The relative rotation between barrels 30 and 40 may be locked such as but not limited to after the assembly stage between the barrels. In the embodiment shown in FIG. 4, a single bung or dowel pin 70 may be inserted into both of the inner wooden barrel's bung hole 39 and the outer wooden barrel's bung hole 49 to lock the rotational position of the inner wooden barrel 30 relative to the outer wooden barrel 40. Upon removal of the single bung 70 for example, the user may fill the first contents into the first volume 32 through each of the respective bung holes 39 and 49. It should be understood that there may be a variety of locking mechanisms between barrels that may be used. For instance, one or more wood dowels may engage and extend between both of the end caps 33, 43 of the barrels thereby locking rotation therebetween. In some embodiments, the bung hole 39 of the inner wooden barrel 30 could be drilled after being inserted into the outer wooden barrel 40 for instance to reduce the likelihood of relative rotation and misalignment.

Figure 4:
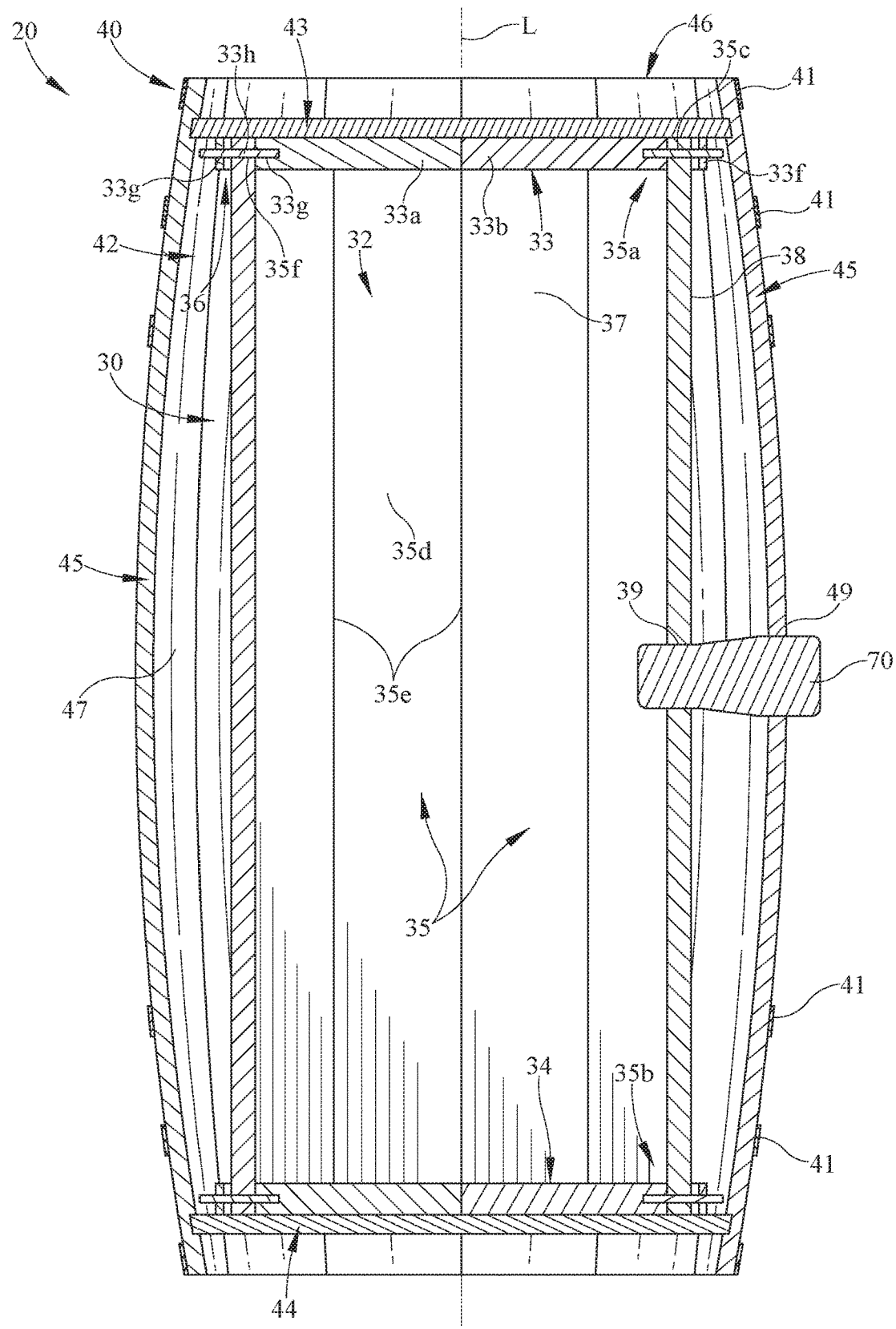
FIG. 4 is a cross sectional view of the wooden barrel apparatus of FIG. 3 taken along line 3-3, illustrating an embodiment of locking the rotational position of the inner wooden barrel relative to the outer wooden barrel.
Figure 5:
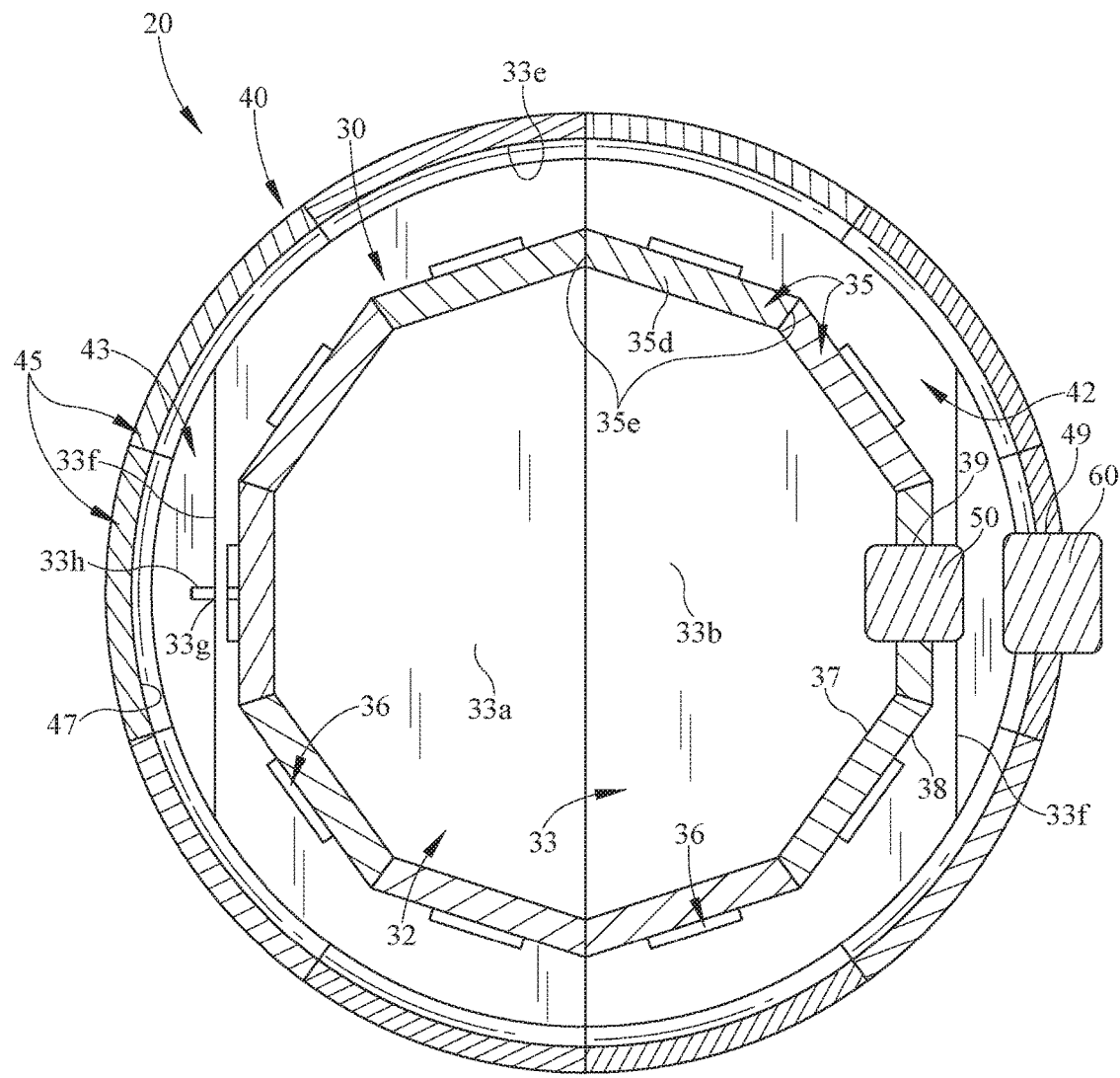
FIG. 5 is a cross sectional view of the wooden barrel apparatus embodiment shown in FIG. 3 taken along line 5-5 in a first rotational position of the inner wooden barrel relative to the outer wooden barrel.
Figure 6:
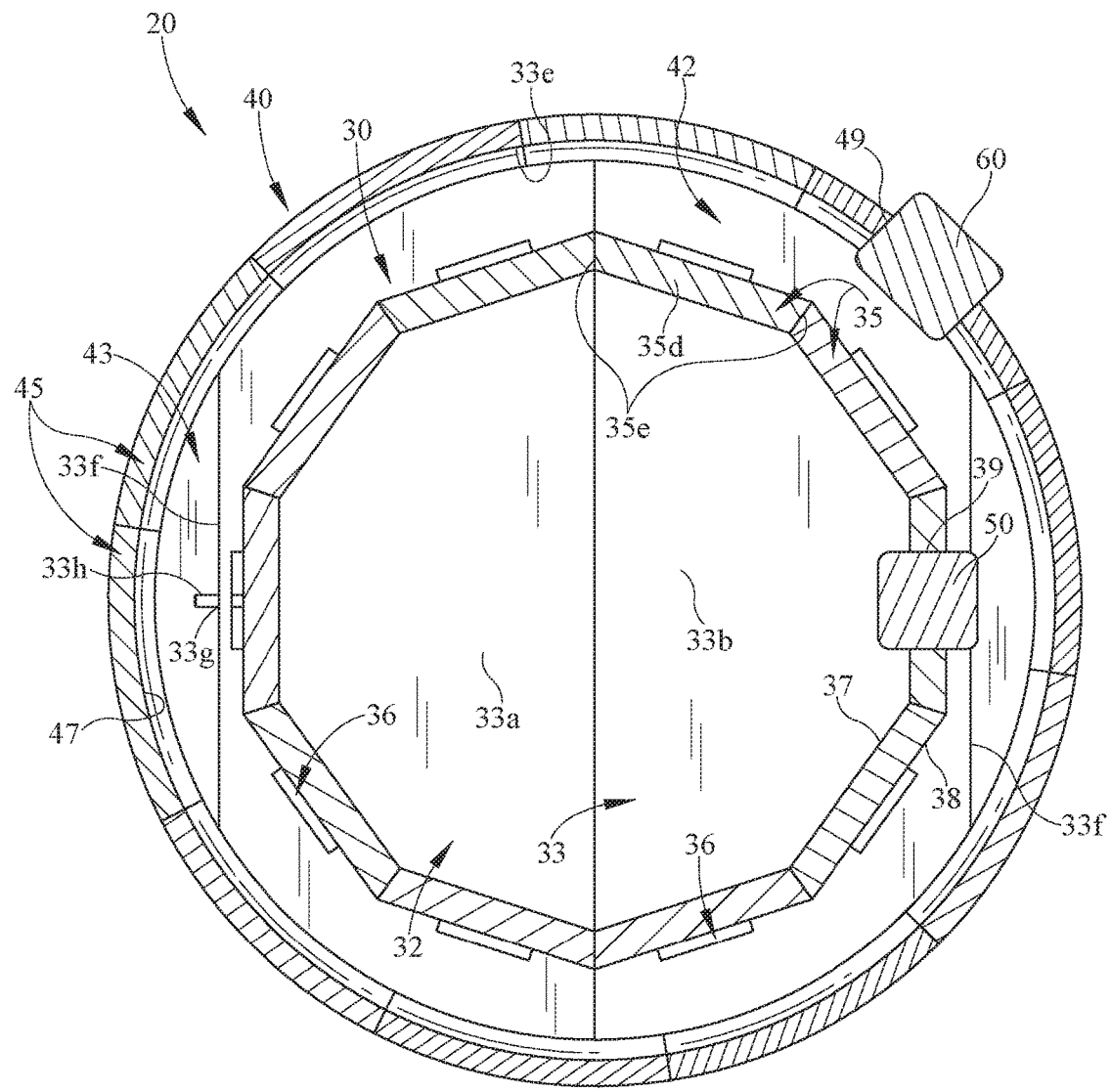
FIG. 6 is a cross sectional view of the wooden barrel apparatus shown in FIG. 3 taken along line 6-6 in a second rotational position of the inner wooden barrel relative to the outer wooden barrel.

In use, portions of the inner wooden barrel 30 and the outer wooden barrel 40 may be charred together or separately. The interior surface 37 and/or exterior surface 38 of the inner wooden barrel 30 may be charred. The interior surface 47 of the outer wooden barrel 40 may be charred. The inner wooden barrel 30 is positioned inside the outer wooden barrel 40 and the first end cap 43 of the outer wooden barrel 40 closes the top opening 46. The inner wooden barrel 30 may be locked in its rotational orientation relative to the outer wooden barrel 40. One example as shown in FIG. 4 may be a single bung or dowel pin 70 engaging each bung hole 39 and 49 of the barrels 30 and 40, respectively. The single bung 70 may be removed before filling the barrels. The first volume 32 of the inner wooden barrel 30 may be filled with the first contents through each bung hole 39 and 49 and subsequently sealed by the bung 50. The second volume 42 between the outer wooden barrel 40 and the inner wooden barrel 30 may be filled with the second contents through the bung hole 49 of the outer wooden barrel 40 and subsequently sealed by the bung 60. The first contents and the second contents may be the same; however, the first contents may be different from the second contents. The bung hole 39 of the inner wooden barrel 30 may be sealed by the bung 50 upon filling the first volume 32 before filling the second volume 42. The bung hole 49 of the outer wooden barrel 40 may be sealed by the bung 60 after filling the second volume 42. It is understood that a variety of methods of sealing the separate volumes of product may be used and subsequently unsealed to remove the contents of the volumes. For example both volumes could be sealed together if desired. The contents of the first volume 32 and second volume 42 can be aged. The contents of the first volume 32 and the second volume 42 may have different properties after aging. These different properties include, but are not limited to, differences in appearance (e.g. color), taste, proof, and/or smell etc. When removing the contents of the first volume 32 and the second volume 42, the second volume 42 may preferably be removed before the first contents of the inner wooden barrel 30. The bung 60 of the outer wooden barrel 40 is removed providing access to the second contents for removal. The bung 50 of the inner wooden barrel 30 may then be removed providing access to the sealed first contents for removal. If the bung 50 is not accessible to remove through the outer wooden barrel bung hole 49, such as but not limited to rotational movement of the inner wooden barrel out of the first rotational position (FIG. 5), an additional opening (not shown) may be created into the first volume 32 through one or more staves 35 of the inner wooden barrel 30. The barrel apparatus 20 may be subsequently reused upon removal of one or more of its contents, or portions of its contents, to produce a variety of products such as, but not limited to, food and/or beverage. Therefore the barrel apparatus 20 may be refilled with a variety of substances to produce a substantially similar or different product that may benefit from the use of the previously aged contents of its container.

Although the barrel apparatus 20 is shown in detail in the drawings, it is merely representative of one embodiment, and it is to be understood that there are a variety of shapes, sizes, orientations, constructions, and quantities which may be used and still be within the scope of the teachings herein.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A wooden barrel apparatus for aging whiskey comprising:
   an inner wooden barrel having a first volume adapted for a first liquid defined by a first end cap, an opposing second end cap, and a plurality of staves, wherein said first end cap is interconnected to said second end cap by said plurality of staves circumferentially positioned in abutting relationship to each other, and wherein one or more interior surfaces of said inner wooden barrel is charred;
   each said stave of said plurality of staves of said inner wooden barrel includes opposing ends;
   wherein said first end cap and said second end cap of said inner wooden barrel includes one or more openings on an interior face thereof, wherein said one or more openings of said interior face of each said first end cap and said second end cap receives said opposing ends of said stave of said plurality of staves, respectively;

an outer wooden barrel surrounding said inner wooden barrel, said outer wooden barrel having a first end cap, an opposing second end cap, and a plurality of staves interconnecting said first end cap and said opposing second end cap, and a second volume adapted for a second liquid between said outer wooden barrel and said inner wooden barrel, and wherein one or more interior surfaces is charred;

said outer wooden barrel has a bung hole within one or more of said plurality of staves;

said inner wooden barrel has a bung hole within one or more of said plurality of staves; and wherein said first volume is separately aged from said second volume.

2. The wooden barrel apparatus of claim 1 wherein said inner wooden barrel includes a first stopper and said outer wooden barrel includes a second stopper separate from said first stopper.

3. The wooden barrel apparatus of claim 1 further comprising a dowel pin inserted within each one of said bung hole of said inner wooden barrel and said outer wooden barrel.

4. The wooden barrel apparatus of claim 1 wherein said bung hole of said inner wooden barrel is smaller than said bung hole of said outer wooden barrel.

5. The wooden barrel apparatus of claim 1 wherein one or more exterior surfaces of said inner wooden barrel is charred.

6. The wooden barrel apparatus of claim 1 wherein an outside diameter of said inner wooden barrel is smaller in diameter than a top opening of said outer wooden barrel, wherein said top opening receives said first end cap or said opposing second end cap of said outer wooden barrel.

7. The wooden barrel apparatus of claim 1 wherein said first volume is about one-half of said second volume.

8. The wooden barrel apparatus of claim 1 wherein said plurality of staves of said inner wooden barrel are planar and perpendicular to at least one of said first end cap and said second end cap of said inner wooden barrel.

9. The wooden barrel apparatus of claim 1 wherein said inner wooden barrel is positionable in a first rotational position relative to said outer wooden barrel, wherein said bung hole of said inner wooden barrel is aligned with said bung hole of said outer wooden barrel and a second rotational position relative to said outer wooden barrel, wherein said second rotational position is different from said first rotational position.

10. The wooden barrel apparatus of claim 1 wherein after aging, said first liquid has different properties from said second liquid in at least one of appearance, smell, proof, and taste.

11. A wooden barrel apparatus for aging whiskey comprising:

an inner wooden barrel having a first volume adapted for a first liquid defined by a first end cap, an opposing second end cap, and a plurality of staves, wherein each said stave of said plurality of staves of said inner wooden barrel includes a tab at both opposing ends thereof;

wherein said first end cap and said second end cap of said inner wooden barrel includes one or more openings on an interior face thereof;

wherein said first end cap is interconnected to said second end cap by said plurality of staves circumferentially positioned in abutting relationship to each other, wherein said one or more openings of said interior face of each said first end cap and said second end cap receives said tab at said opposing ends of said stave of said plurality of staves, respectively;

an outer wooden barrel surrounding said inner wooden barrel, said outer wooden barrel having a first end cap, an opposing second end cap, and a plurality of staves interconnecting said first end cap and said opposing second end cap, and a second volume adapted for a second liquid between said outer wooden barrel and said inner wooden barrel, and wherein one or more interior surfaces is charred;

said outer wooden barrel has a bung hole within one or more of said plurality of staves;

said inner wooden barrel has a bung hole within one or more of said plurality of staves; and wherein said first volume is separately aged from said second volume.

12. The wooden barrel apparatus of claim 11 wherein one or more interior surfaces of said inner wooden barrel is charred.

13. The wooden barrel apparatus of claim 11 wherein said one or more openings of said first end cap and said second end cap extend from said interior face to an exterior face of said first end cap and said second end cap, respectively.

14. The wooden barrel apparatus of claim 11 wherein each said first end cap and said second end cap of said inner wooden barrel comprises a first member and second member creating said interior face of said first end cap and said second end cap, respectively.

15. The wooden barrel apparatus of claim 11 wherein said abutting relationship between said plurality of staves is a tongue-and-groove engagement.

16. The wooden barrel apparatus of claim 11 wherein said one or more openings of said first end cap and said second end cap are in a circumferential pattern spaced from an outer circumference of said first end cap and said second end cap, respectively.

* * * * *